W. R. PORTER.
HOSE PIPE COUPLING.
APPLICATION FILED APR. 29, 1916.

1,267,335.

Patented May 21, 1918.

Inventor
Will R. Porter,

Witness
William J. Russell

By Clifton C. Callowell
Attorney

UNITED STATES PATENT OFFICE.

WILL R. PORTER, OF PRINCE BAY, NEW YORK, ASSIGNOR TO THE S. S. WHITE DENTAL MANUFACTURING COMPANY, A CORPORATION OF PENNSYLVANIA.

HOSE-PIPE COUPLING.

1,267,335. Specification of Letters Patent. Patented May 21, 1918.

Application filed April 29, 1916. Serial No. 94,286.

*To all whom it may concern:*

Be it known that I, WILL R. PORTER, a citizen of the United States, and a resident of Prince Bay, in the county of Richmond, State of New York, have invented certain new and useful Improvements in Hose-Pipe Couplings, of which the following is a specification, reference being had to the accompanying drawings.

My invention relates particularly to the connection between a flexible tube or hose and a device for controlling or distributing the fluid conveyed through said hose, and is especially directed to the means for binding the hose to the nipple of such a device.

The principal objects of my invention are, to provide such a connection with means for binding the tube upon the nipple with such uniform force as to in effect form a composite substantially integral structure incapable of accidental separation or leakage.

Other objects of my invention are to provide a hose pipe connection wherein the tube or hose may be conveniently engaged with the nipple and readily removed therefrom without injury to any of the parts forming said connection.

Specifically stated, the form of my invention herein described provides a hose or tube of rubber engaged with a nipple and embraced by a yielding collar, which is forced into binding engagement with said hose by an internally threaded ferrule having its threads arranged to engage said collar.

My invention further includes all of the various novel features of construction and arrangement as hereinafter more definitely specified.

Figure 1:
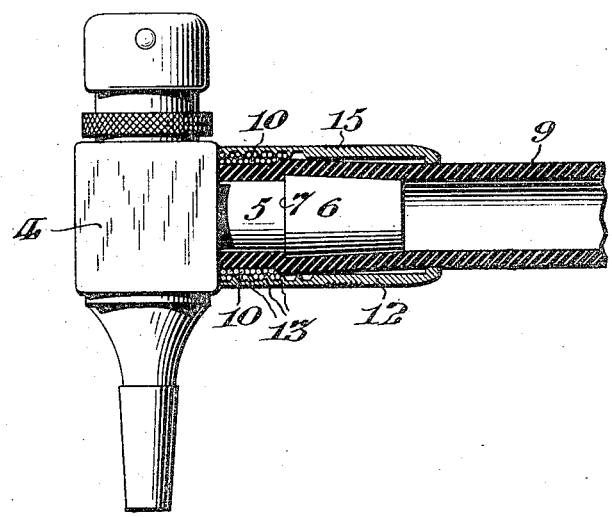
Figure 2:
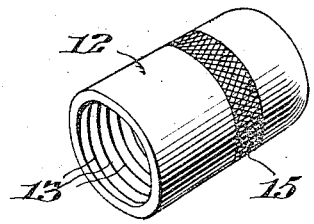
Figure 3:
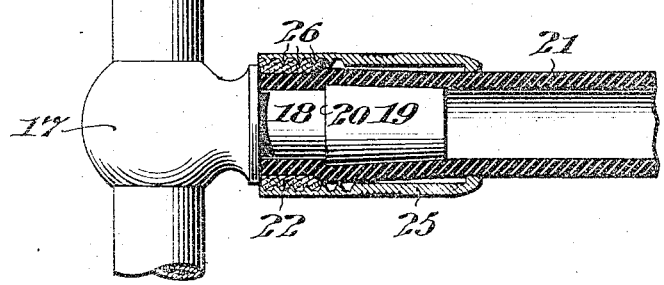

In the accompanying drawings, Figure 1 is a side elevational view of a valve to which a hose is connected in accordance with my invention, said hose and its attaching means being shown in section for convenience of illustration; Fig. 2 is a perspective view of the ferrule shown in Fig. 1; and Fig. 3 is a side elevational view of a T-fitting, having a hose connection shown in section and embodying a modification of my invention.

In said figures, the valve body 4 is provided with the laterally extending hollow nipple 5 having the tapered portion 6 which provides a shoulder 7 serving to retain the hose 9, which may be slipped over said nipple and wrapped between the valve body 4 and the shoulder 7 with strands of string or other suitable material in the form of strands to provide a yielding collar 10, as shown in Fig. 1.

The collar 10 may be forced into tight engagement with the hose 9 by the ferrule 12, which encircles said hose and which may be rotated thereon to engage its threads 13 with the collar 10 so as to tightly bind it upon the hose between the valve body 4 and the shoulder 7, thereby preventing the accidental longitudinal movement of said hose upon the nipple 5. Said ferrule 12 is provided with a knurled band 15, as best shown in Fig. 2, by which it may be conveniently rotated between the thumb and finger of the operator.

It may be here noted that it has been found in practice that the best results may be obtained wherein the exterior strands forming the collar 10 are helically coiled away from the bound end of the hose 9 and terminate adjacent to the shoulder 7.

It will be obvious that when the ferrule 12 has its threads 13 engaged with the collar 10 and its end abutted against the valve body 4, further rotation of said ferrule will naturally tend to force the collar back away from the valve body 4, which will also tend to carry that portion of the hose 9 between the valve body and the shoulder 7 longitudinally against said shoulder with such force as to render impossible the accidental displacement of said hose from the nipple 5 or any leakage between the hose and said nipple.

In the form of my invention shown in Fig. 3, the T-fitting body 17 is provided with the laterally extending hollow nipple 18 having the tapered portion 19 which provides a shoulder 20 serving to retain the hose 21, which may be slipped over said nipple and embraced by an annular collar 22 formed of pliant material such as felt, rubber, leather, lead, or in fact any material into which threads may be formed by the rotative engagement of the ferrule 25 having the threads 26 therewith.

I do not desire to limit my invention to the precise details of construction and arrangement herein specified, as it is obvious that various modifications may be made therein without departing from the essential features of my invention as defined in the appended claims.

Having thus described my invention, I claim:

1. A coupling for connecting a hose to a hollow nipple over which the end of said hose may be slipped, comprising a collar formed of strands of suitable material wrapped about said hose, and a ferrule having screw-threads arranged to engage said collar, and form threads therein.

2. A coupling for connecting a hose to a hollow nipple over which the end of said hose may be slipped, comprising a collar formed of strands of suitable material wrapped helically about said hose, and a ferrule movable longitudinally on said hose and having screw-threads arranged to engage said collar, and form threads therein.

3. A coupling for connecting a hose to a hollow nipple over which the end of said hose may be slipped, comprising a collar of yielding material formed about that portion of said hose overlying said nipple, and a ferrule having internal screw-threads arranged to engage said collar in threaded relation therewith, and bind said collar thereon.

4. A coupling for connecting a hose to a hollow nipple having a shoulder, over which the end of said hose may be slipped, comprising a collar formed of strands of suitable material helically wrapped about said hose in proximity to said shoulder, and a ferrule having screw-threads arranged to engage said collar thus formed, in threaded relation therewith.

5. A coupling for connecting a hose to a fluid controlling or distributing device, having a hollow nipple provided with a shoulder, over which the end of said hose may be slipped, comprising a collar formed of strands of suitable material wrapped about said hose between its end and said shoulder, and a ferrule rotatably embracing said hose and having screw-threads arranged to engage said collar in threaded relation therewith, irrespective of said strands.

In witness whereof, I have hereunto set my hand this 25th day of April, A. D., 1916.

WILL R. PORTER.

Witnesses:
WM. H. DAVID,
ROBT. K. LYONS.

Copies of this patent may be obtained for five cents each, by addressing the "Commissioner of Patents, Washington, D. C."